March 21, 1939. W. H. TAYLOR ET AL 2,151,340
BAND FORMING AND PLACING APPARATUS
Filed April 13, 1936 10 Sheets-Sheet 4
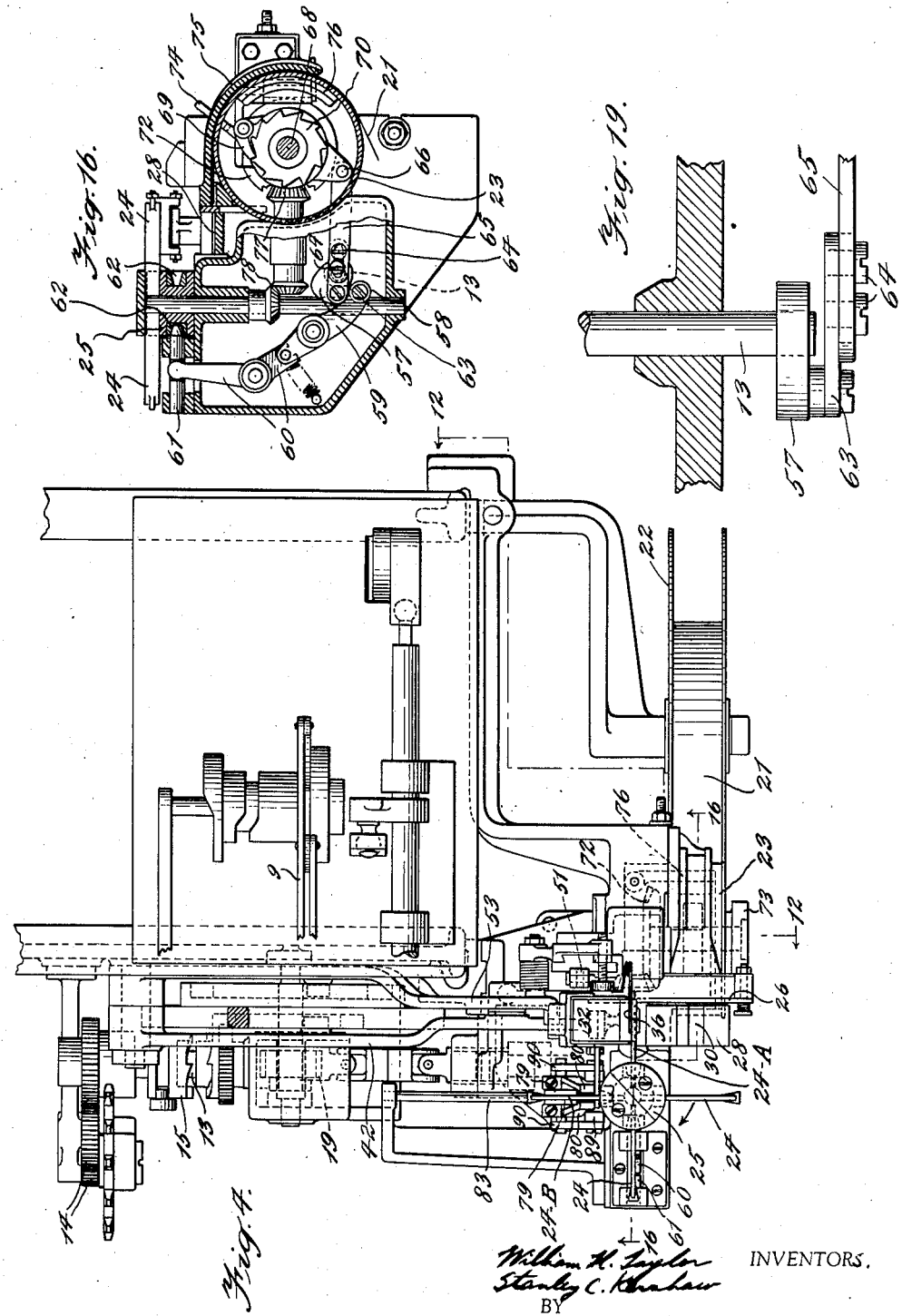
INVENTORS.
William H. Taylor
Stanley C. Kershaw
BY
Gifford, Scull & Burgess
ATTORNEYS.

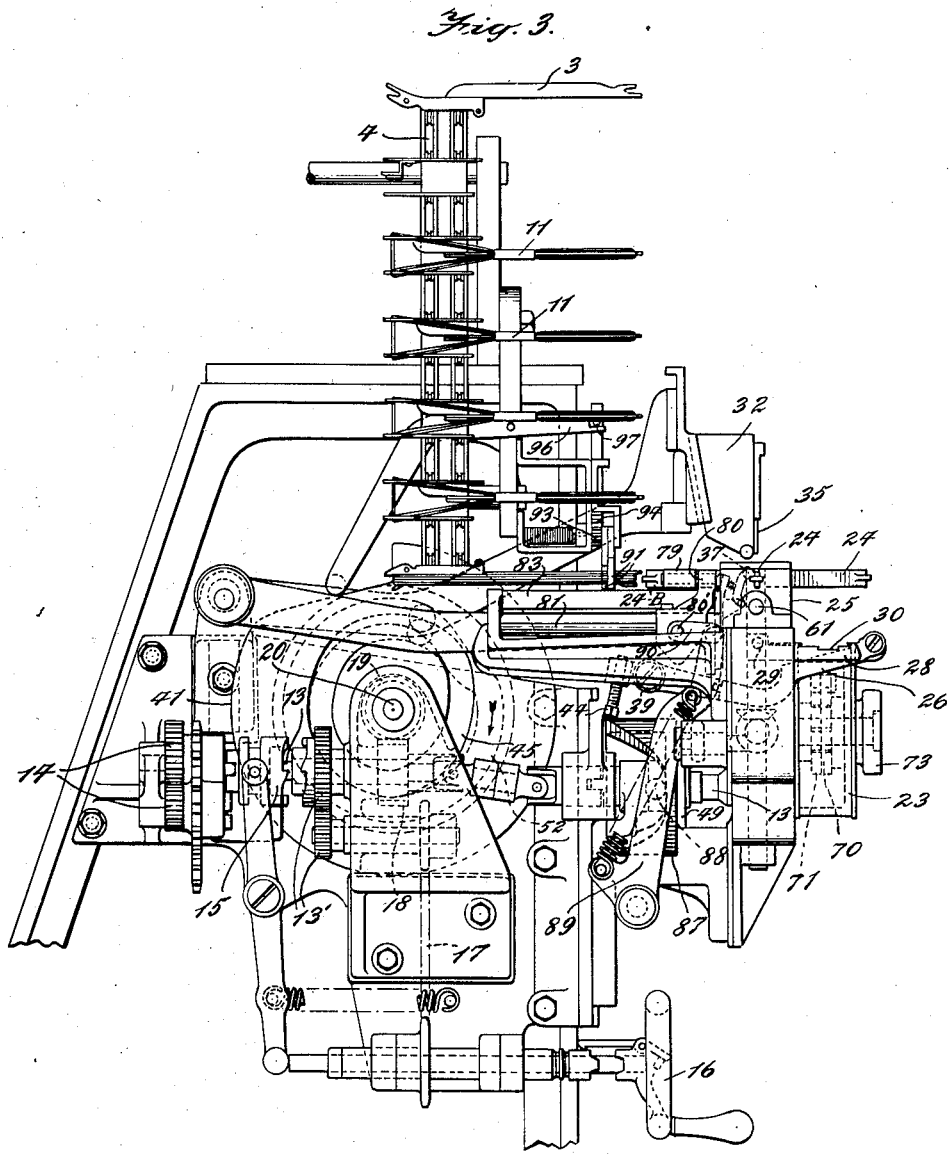

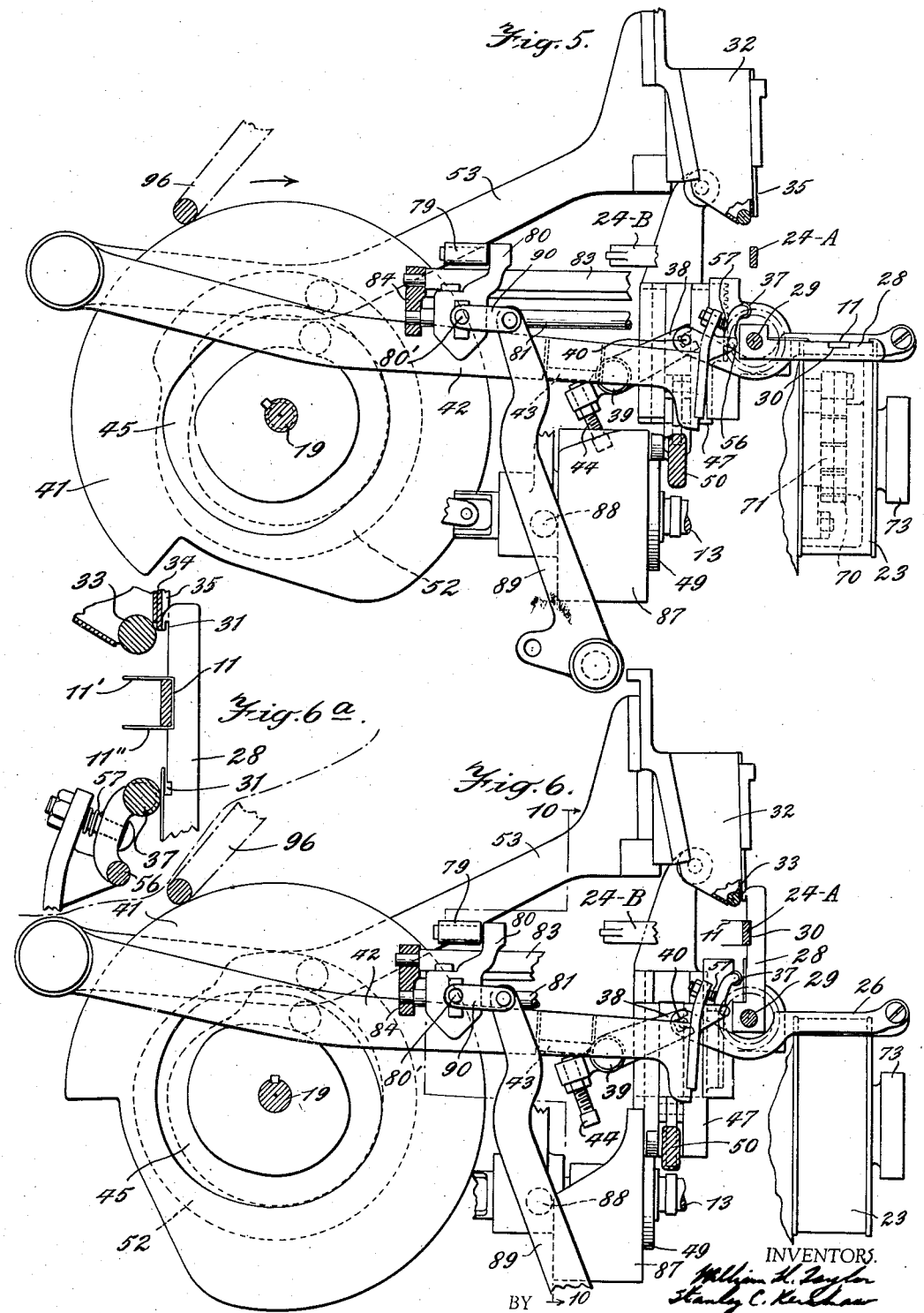

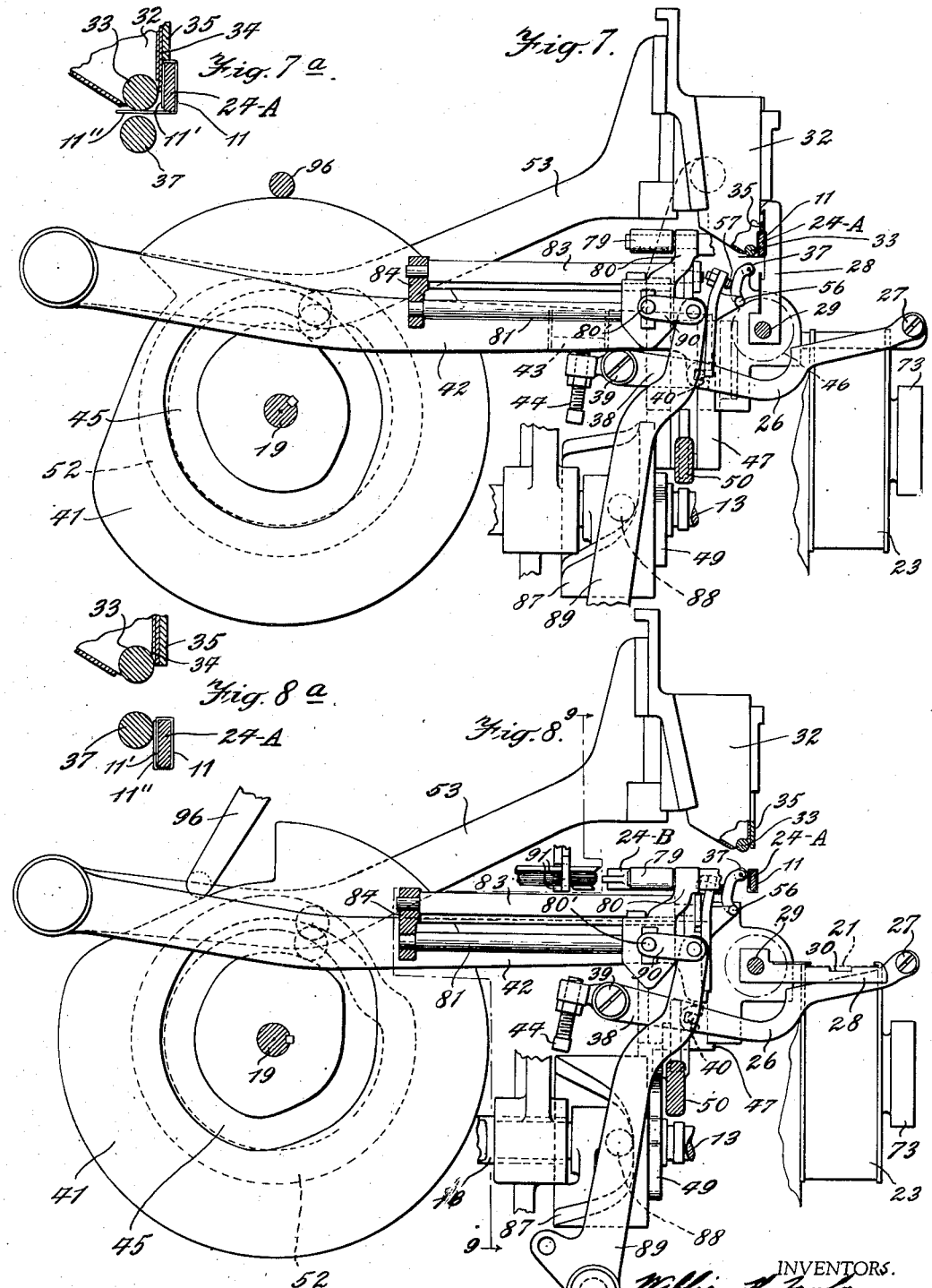

March 21, 1939. W. H. TAYLOR ET AL 2,151,340
BAND FORMING AND PLACING APPARATUS
Filed April 13, 1936 10 Sheets-Sheet 7
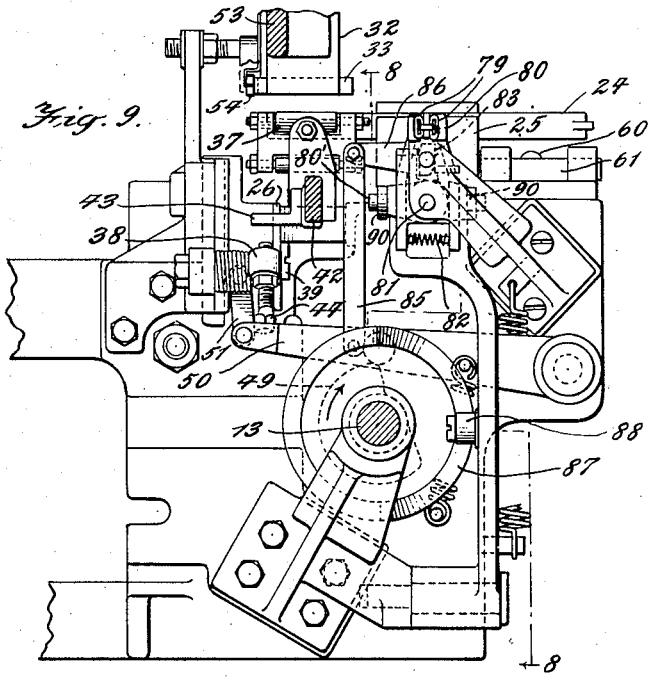
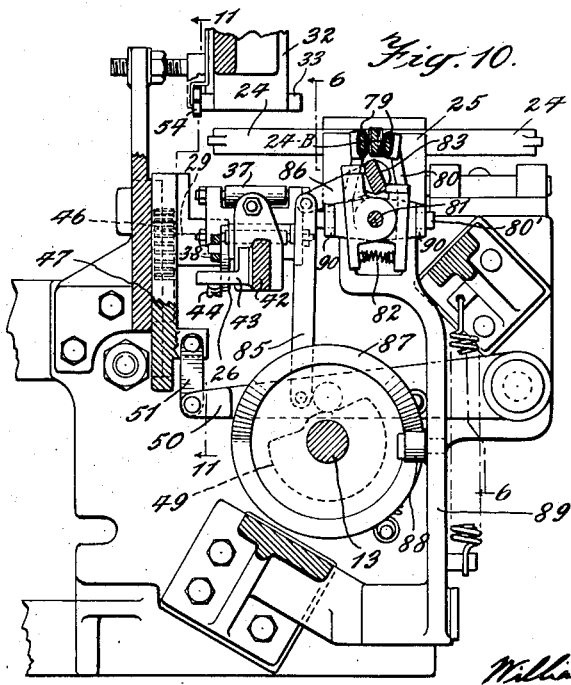
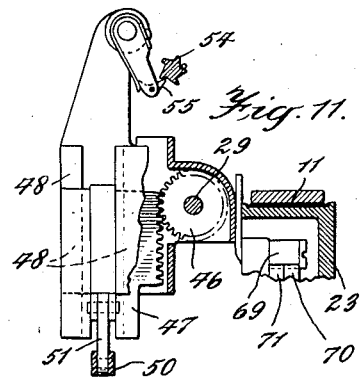
William H. Taylor
Stanley C. Khedau INVENTORS.
BY Gifford, Scull & Burgess ATTORNEYS.

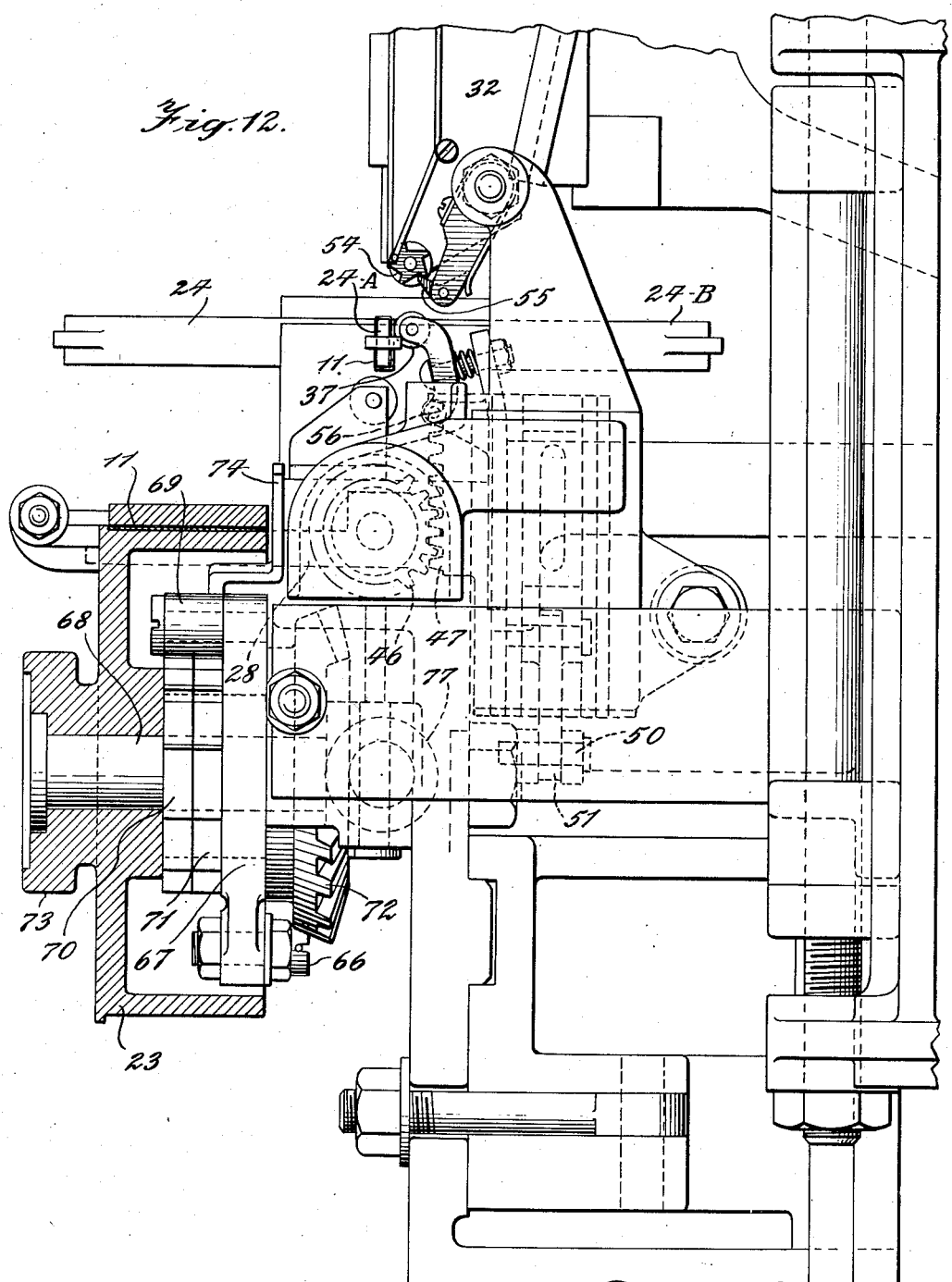

March 21, 1939.  W. H. TAYLOR ET AL  2,151,340.
BAND FORMING AND PLACING APPARATUS
Filed April 13, 1936   10 Sheets-Sheet 9
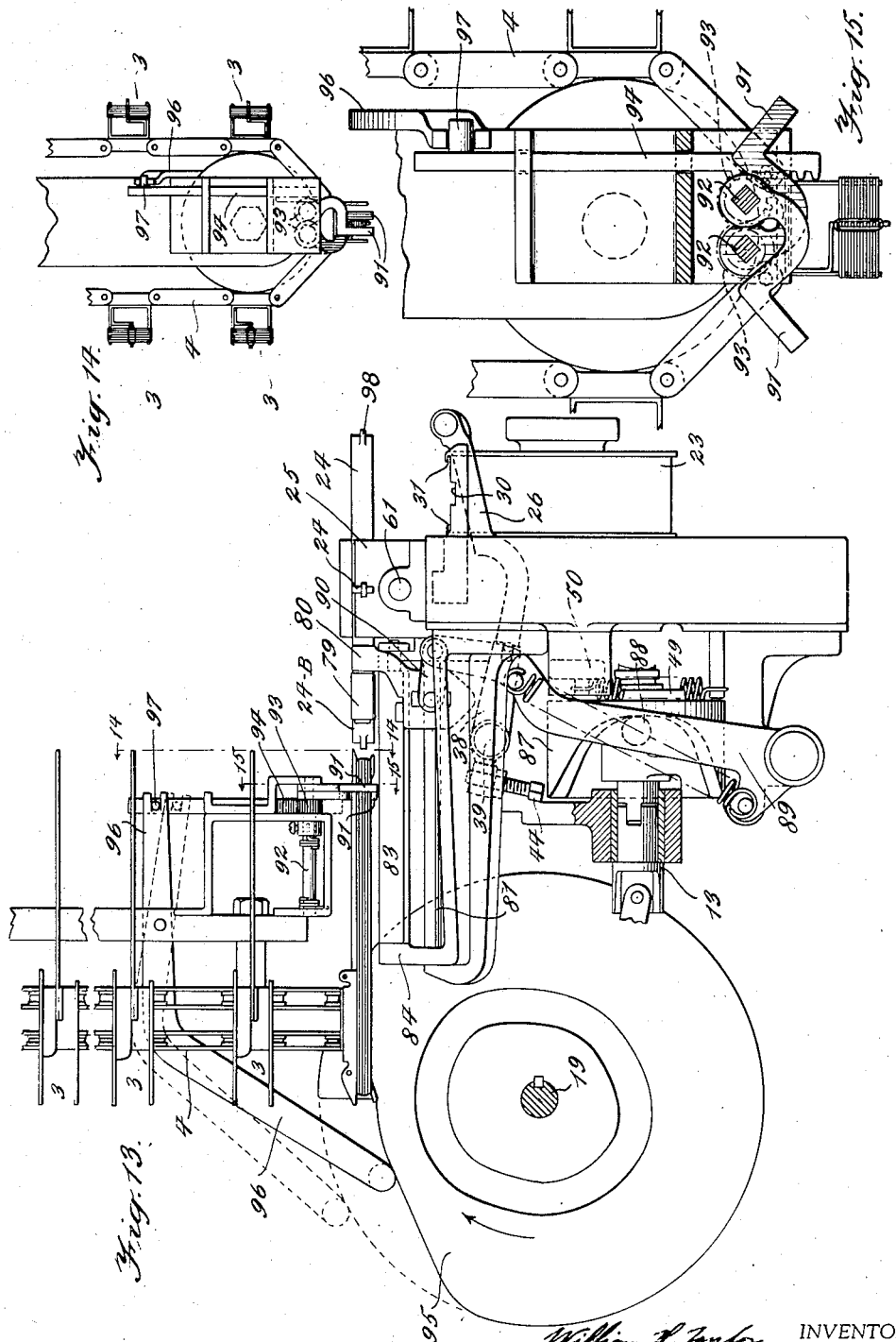
INVENTORS
William H. Taylor
Stanley C. Kelsham
BY
ATTORNEYS March 21, 1939. W. H. TAYLOR ET AL 2,151,340
BAND FORMING AND PLACING APPARATUS
Filed April 13, 1936 10 Sheets-Sheet 10

INVENTORS
William H. Taylor
Stanley C. Ketcham
BY Gifford, Scull & Burgess
ATTORNEYS.

Patented Mar. 21, 1939

2,151,340

UNITED STATES PATENT OFFICE 2,151,340

BAND FORMING AND PLACING APPARATUS

William H. Taylor and Stanley C. Kershaw, Pawtucket, R. I., assignors to The Clark Thread Company, Newark, N. J., a corporation of New Jersey Application April 13, 1936, Serial No. 74,034

15 Claims. (Cl. 28—21)

This invention relates to a novel and improved form of band forming and placing apparatus, the novel features of which will be best understood from the following description and the annexed drawings, in which we have shown a selected embodiment of the invention and in which:

Fig. 3 is a view taken from the left of Fig. 2;

Fig. 4 is a plan view of the structure appearing in Fig. 3, certain parts being omitted for the sake of clearness;

Figure 17:
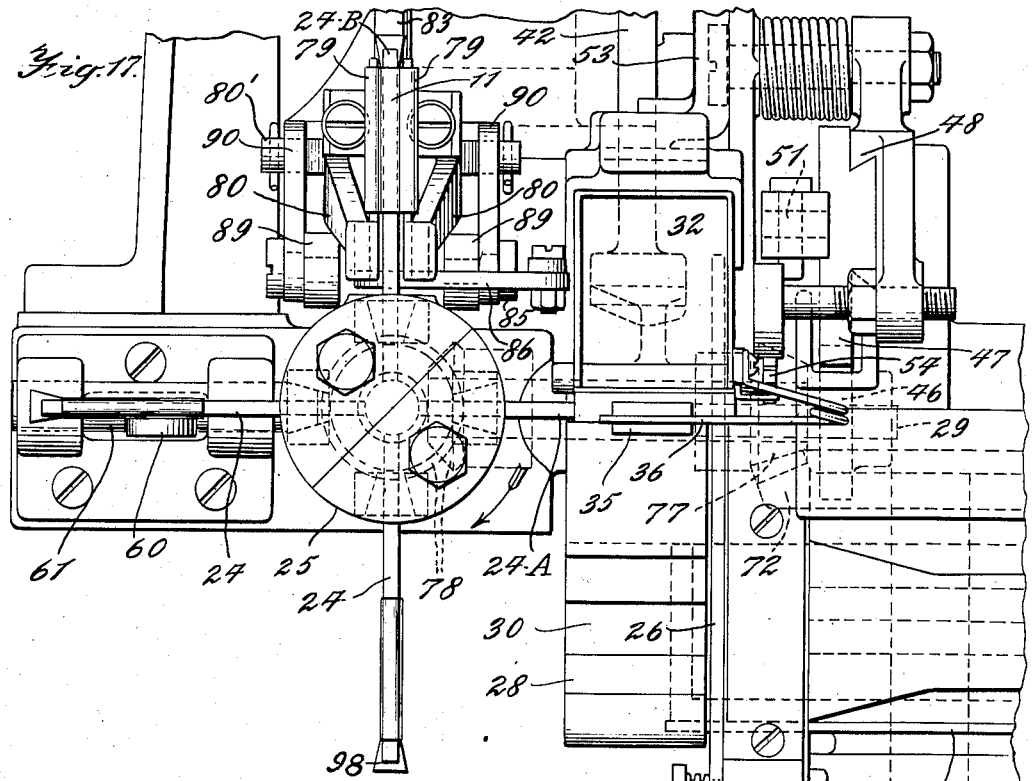
Figure 18:
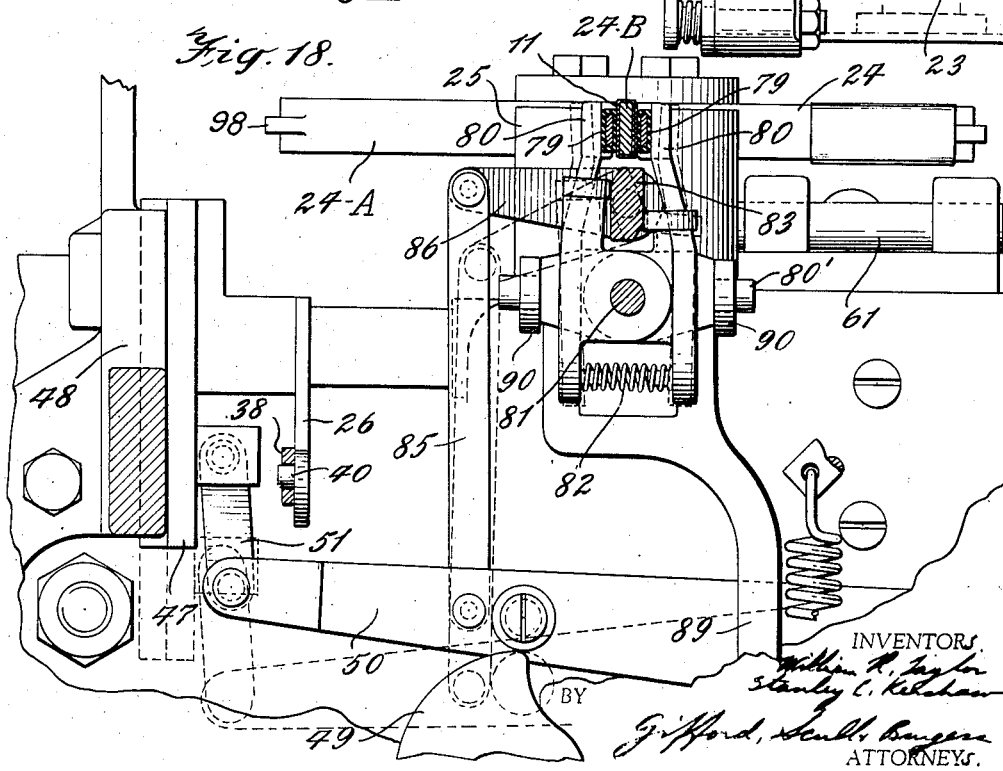

Figs. 5, 6, 7, and 8 are views of the same apparatus showing the parts in different positions and all taken approximately on the line 6—6 of Fig. 10 or line 8—8 of Fig. 9, and showing the operation of forming the band;

Figs. 6a, 7a, and 8a are fragmentary views on an enlarged scale, showing diagrammatically successive steps in the operation shown on a smaller scale in Figs. 6, 7, and 8, respectively;

Fig. 9 is a view taken approximately on the line 9—9 of Fig. 8;

Fig. 10 is a view taken approximately on the line 10—10 of Fig. 6;

Fig. 11 is a view taken approximately on the line 11—11 of Fig. 10;

Fig. 12 is a view on an enlarged scale, taken approximately on the line 12—12 of Fig. 4;

Fig. 13 is a view on an enlarged scale and on approximately the same plane as that of Fig. 3 and showing in more detail certain parts appearing in Fig. 3;

Fig. 14 is a view approximately on the line 14—14 of Fig. 13;

Fig. 15 is a view approximately on the line 15—15 of Fig. 13;

Fig. 16 is a view approximately on the line 16—16 of Fig. 4;

Fig. 17 is a view on the same plane as Fig. 4, but on a greatly enlarged scale and showing the relation of the turret to the parts with which it cooperates in forming the band and placing it upon the skein;

Fig. 18 is a view on an enlarged scale and on the same plane as Fig. 10, but showing certain parts thereof more plainly;

Fig. 19 is a detail plan view of certain of the elements shown in Fig. 16.

According to prior art practice, yarn has been formed into skeins and the bands have been placed on individual skeins by hand, after which the skeins have been automatically removed and bundled. The bands have been formed on suitable machinery and placed conveniently for the operator of the skeining machine so that they may be placed on the skeins by hand. According to the present invention, however, the bands are automatically formed and placed on the skeins before they are removed from the skeining machine.

For the purpose of illustration, we have shown the invention as applied to a skeining machine of the type shown in the patents to Clauss 1,401,515 and 1,401,516, and from which the skeins are removed and bundlled in the same general way as in the Clauss Patent 1,401,520. Before being removed, the ends of the skein may be bound as shown in the Clauss Patent 1,401,519. Parts of the mechanisms illustrated in the above patents appear in the drawings herein and will be referred to generally only so far as is necessary for an understanding of the present invention.

Figure 1:
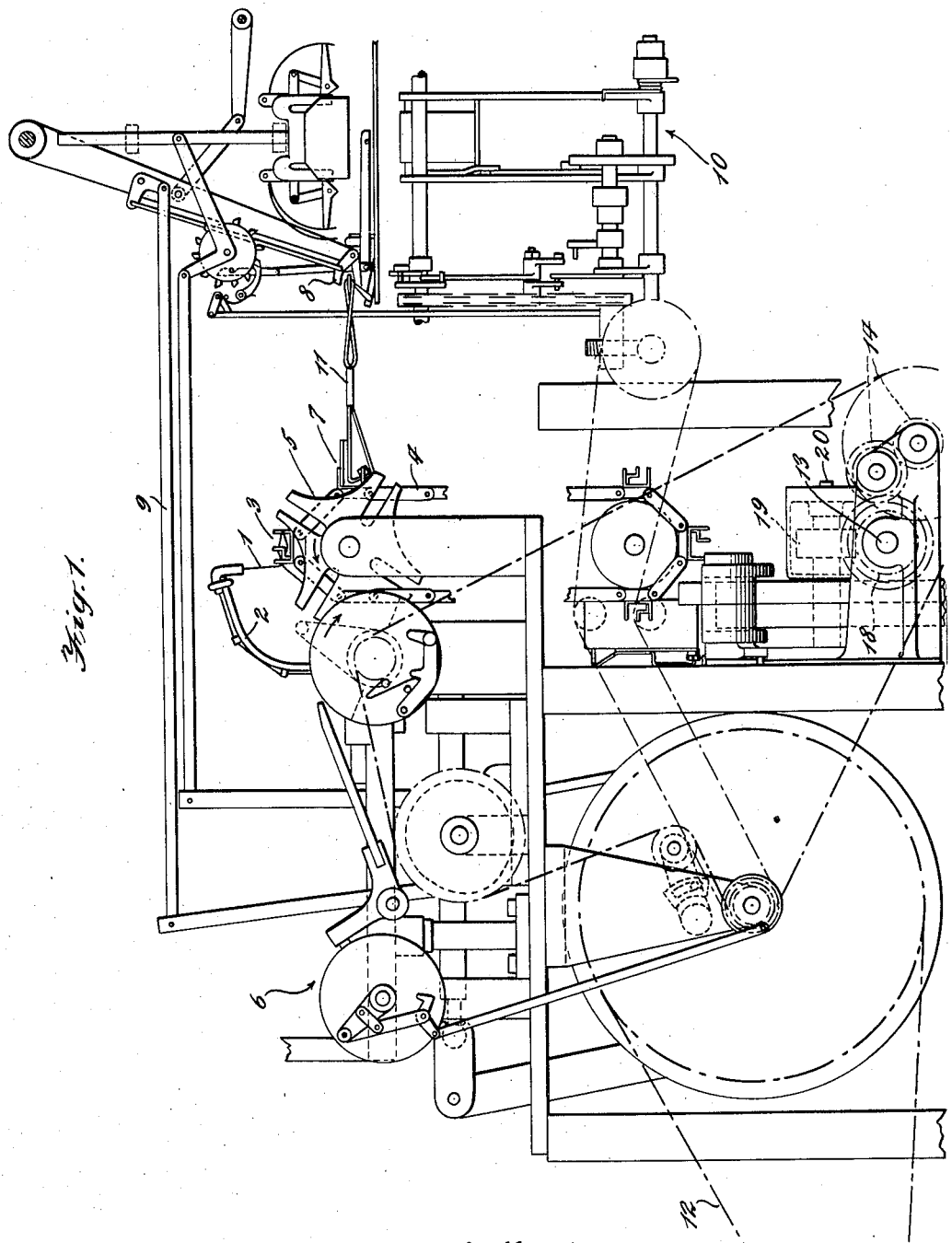
Fig. 1 is a rear view of an apparatus having the invention embodied therein.
Figure 2:
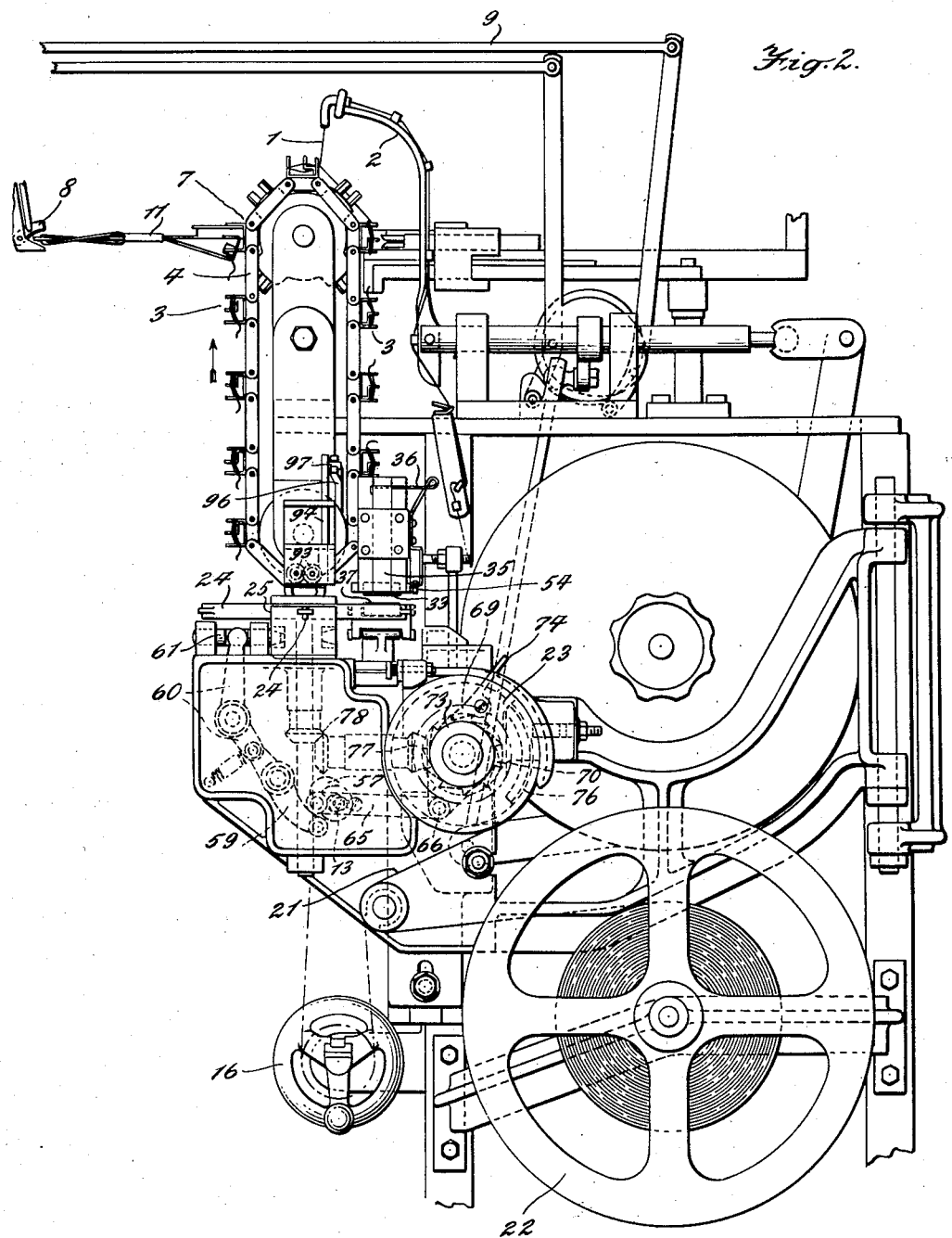
Fig. 2 is a front view of part of the apparatus appearing in Fig. 1, but drawn on an enlarged scale.

Referring first to Figs. 1, 2, and 3, the skeins are formed of yarn 1 fed by the flier arm 2 to skein-supports, here shown as stalks indicated generally by the numeral 3 and which may be of the construction shown in said Clauss Patents 1,401,515 and 1,401,516. These stalks are mounted on a conveyor 4, here shown as a chain conveyor, which may be operated intermittently, as by a Geneva movement 5, to bring the stalks one by one into position for the skeins to be formed thereon by the flier arm. The flier arm may be operated by any suitable mechanism, which is indicated herein generally by the numeral 6, and the details of which are not important to an understanding of the present invention and therefore will not be discussed further.

After the skein is formed, it is carried by the conveyor in the direction indicated by the arrow in Fig. 2, until it reaches the position indicated at 7 in that figure, where the stalk is caused to swing at right angles to its previous position and to release the skein thereon to the jaws 8, which may correspond generally to the jaws 45 and 46 of said Clauss Patent 1,401,520. The upper jaw 8 is operated through a suitable connection 9 from the machine 6, as more fully set forth in said Patent 1,401,520, and suitable mechanism is likewise provided for removing the skein and for swinging the stalk back into position to receive another skein and then for bundling the skeins. In Fig. 1 we have shown parts of such mechanism at 10, and for further details thereof reference is made to said Patent 1,401,520.

Hitherto the bands 11 for the skeins have been made on a separate machine and a supply thereof has been placed convenient for the operator of the skeining machine. The operator may then slide a band over the end of a skein on a stalk after the skein is formed and some time during its travel to the position 7. According to the present invention, however, this work is done automatically by means which we shall now describe.

The apparatus 6 may be driven from a motor, not shown, by means of a chain or belt 12, and by the driving connections indicated in Fig. 1 power may be transmitted to a shaft 13, part of said driving connections comprising the gearing 14 shown in Figs. 1 and 3 and a clutch 15 shown in Fig. 3, and manually operated from a hand-wheel 16. When the clutch is in the position shown in Fig. 3, the shaft 13 is being operated by the above connections, but the clutch may be thrown into position to operate the shaft 13 from the hand-wheel 16 by means of a chain drive 17 and the gears 13'.

Secured to the shaft 13 is a spiral gear 18 meshing with a gear 19 on a cam shaft 20. The shafts 13 and 20 operate the band forming and placing apparatus, which will now be described in detail, and their connections to these two shafts will be apparent during that description.

The bands are formed from a strip 21 of paper which may be wound upon a reel 22, as best shown in Fig. 2, and from this reel a strip is fed intermittently by the index roll 23 to a position beneath one of the arms 24 of a turret 25. The band is then formed on this arm of the turret as a mandrel, and the turret is rotated intermittently to a position wherein the band may be stripped from the arm and slipped over a skein on a stalk of the conveyor. The band is formed on an arm when at the position 24—A, as seen in Figs. 4 and 17, and this turret is rotated in the direction of the arrows in those figures to the position indicated at 24—B therein, at which the band is removed from the arm and slipped over the skein. In the present instance we have shown the turret as having four arms, although it will of course be understood that this number may be changed if found suitable.

Referring now particularly to Figs. 5, 6, 7, 8, and 6a, 7a, and 8a, we have shown two arms of the turret at the positions 24—A and 24—B, omitting the rest of the turret. The strip 21 is shown in dotted lines in Fig. 8 in position to be severed by a knife 26 which is pivoted at 27 on the frame of the machine. This knife may be raised by any suitable mechanism to the position indicated in Fig. 5 to sever a length of strip necessary to form a band. In other words, Fig. 5 shows in full lines a short section of the strip 21, after being severed to form a band 11. After a section of strip has been severed to form a band, it will be designated by the numeral 11.

In Fig. 5 the band 11 is shown as it will appear after being severed, and it will be seen that it is supported upon a table 28 which is supported upon a rock shaft 29. As shown in Fig. 6, the table 28 is next rotated in a counterclockwise direction to a position where it will engage the arm 24—A and simultaneously form the band 11 into the shape of a U. This may be done conveniently by forming the table 28 with a recess 30 of the proper width and depth for this purpose. That is to say, this recess is slightly wider than the depth of an arm 24 and is deep enough to fold the band into the U-shape shown in Figs. 6 and 6a. The top of the table 28 is provided with recesses 31 to receive the opposite edges of the band 11 and to hold it during the movement of the table from the position shown in Fig. 5 to that shown in Figs. 6 and 6a.

The next step is indicated in Figs. 7 and 7a. Above the arm 24—A is disposed a paste pot 32 having an opening at the bottom partially closed by a roller 33, and this paste pot is mounted for vertical movement. When the parts have reached the position shown in Figs. 6 and 6a, the paste pot then descends to the position shown in Figs. 7 and 7a, and in so doing the roller 33 will wipe across the outer surface of the leg 11' of the U and will fold this arm down against the arm 24—A of the turret. By this action not only is the leg 11' forced down to the position indicated in Figs. 7 and 7a, but paste is also applied thereto. The final forming of the leg 11' of the band against the arm 24—A of the turret is done by means of a former 34 in front of the roller 33, and which may be the front wall of the paste pot. Slidably mounted on this front wall is a former plate 35, best shown in Fig. 2, and which is normally urged downwardly by means of a spring 36. When the parts have reached the position shown in Figs. 7 and 7a, this plate will force the band against the top of the arm 24—A, as plainly indicated in those figures, thus aiding in conforming the band to the shape of the turret arm and also holding the band on the turret arm as the paste pot now moves upwardly.

Referring now to Figs. 8 and 8a, it will be seen that the next step is for the paste pot to be moved upwardly, during the initial part of which movement the plate 35 will still remain in contact with the band on the arm 24—A. Vertically mounted beneath the roller 33 is a second forming roller 37 which is now moved upwardly and engages the lower leg 11" of the band and moves it upwardly into engagement with the paste-covered outer surface of the leg 11', and by pressing these two legs together, the band is completed on the arm 24—A.

The knife 26 may be operated in proper timed relation by any suitable means, here exemplified as a forked arm 38 pivoted at 39 to the frame of the machine and having the forked end thereof engaging a pin 40 on the knife. Rocking of the arm 38 may be caused by the cam 41 operating the cam arm 42 which has a projection 43 (Figs. 9 and 10), which in turn is adapted to engage an adjustment screw 44 on the arm 38. It will be seen that the cam 41 has a cam groove 45 in one face thereof adapted to engage a roller on the arm 42.

Rocking of the rock shaft 29 to actuate the table 28 may be caused by the mechanism best shown in Figs. 9, 10, and 11, although also appearing in Figs. 5, 6, 7, and 8. Mounted on the shaft 29 is a pinion 46 having engagement with a rack 47 which is vertically movable in guides 48. This vertical reciprocation may be given by a cam 49 on the shaft 13 which engages a roller on a cam arm 50 connected to the rack through a link 51. The cam 49 is so designed as to operate the table in proper timed sequence with the other operations as described above and as will be described later.

The vertical reciprocation of the paste pot may be caused by the cam 41 through a cam groove 52 on the opposite side from the groove 45 and which receives a roller on a cam arm 53 on which the paste pot is mounted. The roller 33 at the bottom of the paste pot may become stuck in position so that it will not rotate unless some means is provided for causing it to rotate. Such means is exemplified herein by a ratchet 54 (Figs. 9, 10, and 11) mounted on one end of the roller and adapted to be engaged by a spring-pressed pawl 55 upon downward movement of the paste pot. This engagement will cause a partial rotation of the roller so as to insure that a fresh supply of paste will appear on the roller face to engage the leg 11' of the band on the arm 24—A.

The roller 37 is likewise given a vertical reciprocation in proper timed relation to that of the roller 33. This reciprocation of the roller 37 may be provided by mounting it upon the cam arm 42, as plainly shown in Figs. 5, 6, 7, and 8. Preferably, this roller is yieldingly urged towards the arm 24—A, and for that purpose it is pivotally mounted upon the cam arm as at 56, and is urged towards the arm 24—A by means of the spring 57 which acts between the roller and the cam arm on which it is mounted.

The band is now formed on the arm 24—A, and the turret is then rotated or indexed, in this embodiment this indexing meaning a quarter turn of the turret. After three of such quarter turns, the arm has reached the position indicated as 24—B, at which position the arm is in line with one of the stalks on the conveyor, and then the band is stripped from the turret arm and slid over the skein on the stalk. The turret is preferably held in locked position after being indexed, and the mechanism for thus locking it and also for giving it its intermittent rotation, and the intermittent rotation of the drum 23, is best shown in Figs. 12, 16, and 19.

Mounted on the shaft 13 is a combined cam and crank 57, the cam engaging a roller 58 on an arm 59 which has at the opposite end thereof a pin engaging a forked end of an arm 60 pivoted intermediate its ends and having a head at the other end engaging in a groove in a locking pin 61 adapted to be received in a hole 62 in the turret. Of course, it is understood that there will be one of these holes for each one of the arms 24 of the turret.

The crank part of the member 57 operates a link formed in two parts, the part 63 having a slot receiving adjustment screws 64 on the part 65 pivoted at 66 to a plate 67. This plate is swiveled on the hub of a bevel gear 72, which is rotatably mounted on a fixed stud 68. Also rotatabe on the stud 68 are the two parts 70 and 71 of a double ratchet adapted to be actuated by a pawl 69 on the plate 67. The part 71 is fixed on the hub of the gear 72 to rotate therewith, whereas the part 70 is rotatably mounted on said hub so that it may rotate independently of the gear 72. Thus reciprocation of the plate 67 will cause intermittent movement of the gear 72. By adjustment of the length of the link, the throw of the pawl may be varied.

Also loosely mounted on the study 68 is the drum 23 which serves to feed the paper strip to the band-forming device, and integral with the drum is a handle 73 and the part 70 of the double ratchet. The pawl 69 is pivoted on the plate 67, as noted above, and engages both parts 70 and 71 of the ratchet, from which parts it may be released by means of a handle 74. By this arrangement it will be seen that by turning the handle 73 in a counterclockwise direction in Figs. 2 and 16, it will be possible to rotate the drum independently of the bevel gear 72. The parts are so arranged that the pawl 69 will normally be in engagement with aligned teeth of the two ratchet parts 70 and 71, and if then the drum is given a counterclockwise motion independently of the bevel gear 72, the teeth on the two ratchet parts may be brought into alignment again by a short movement clockwise until a tooth on the part 70 is stopped by the pawl. This arrangement is of particular utility when threading the strip into place.

Cooperating with the drum 23 is a presser plate 75 adapted to frictionally hold the strip in close engagement with the drum. The drum is also provided with a brake 76 to insure that the drum will not overrun the position at which it is stopped by the movement of the pawl 69.

During normal operation, the turret is given its indexing movement by the crank actuating the pawl and ratchet and consequently the bevel gear 72, which meshes with a bevel pinion 77 on a shaft which drives the spindle of the turret through a bevel gear drive 78. By this connection it will be seen that the indexing rotation of the drum is accompanied by an indexing rotation of the turret, it being understood that the parts are so designed that the cam part of the member 57 will release the turret before the pawl 69 comes into action to rotate the gear 72.

Assume now that the turret has been indexed so that an arm carrying a band is at the position indicated at 24—B, that is to say, is in line with a stalk on the conveyor which has an unbanded skein formed thereon. In the illustrated embodiment, the parts are so arranged that the band is placed upon the skein at the extreme bottom of the conveyor, although, of course, this arrangement may be changed if desired.

In Fig. 17 we have shown a band on the arm at the position 24—B, and it will be seen that on opposite sides of the band are disposed grippers 79. The grippers are mounted on the arms 80 which are pivoted at 81 on a common center and normally urged towards each other and towards the turret arm between them by means of a spring 82.

In Fig. 10 the jaws are shown open and they are also shown open in dotted lines in Fig. 18. They may be forced open by means of a cam 83 disposed between the arms 80, and which is here shown as in the form of an elongated bar pivotally mounted at its ends in a bracket 84 (Fig. 13).

The cam 83 may be rocked so as to move the pressers into and out of engagement with a band on the arm 24—B therebetween by means of a link 85 connecting the cam arm 50 to a rock arm 86 secured to the cam (Figs. 9 and 10). Movement of the grippers lengthwise of a turret arm may be caused by a cam 87 on the shaft 13 which engages a roller 88 on a cam arm 89 having a forked upper end connected to links 90, each of which is in turn pivoted to a pusher bar 80' on which the presser arms 80 are pivoted. The pivot 81 of the presser arms comprises a rod upon which the two presser arms may slide, and this sliding will be caused by the cam 87 through the connections just described.

The cams 87 and 83 are so designed and operated in such timed relation to each other and to the other parts previously described that, while the indexing of the turret takes place, the presser arms are in the positions indicated in Figs. 5 and 6 where they are out of the path of movement of the turret arms. Then, after the indexing operation of the turret has taken place and an arm is located at the position 24—B with a formed band thereon, the presser arms are moved towards the right, as seen in Figs. 5, 6, 7, and 8, and until they come to the position shown in Figs. 7 and 8. During all this time the pressers will be separated from each other by the cam 83, but at the end of their travel towards the turret they come to rest on opposite sides of a band on a turret arm. Then the cam 83 is operated so that the spring 82 will force the pressers into engagement with the band. Then the cam 87 comes into operation and moves the presser arms along the rod 81 towards the left of the various figures, particularly Fig. 13, carrying the band between them. Since a skein is in line with the arm 24—B, the pressers will travel along opposite sides of that skein and place the band over the end of that skein, it being understood that the spring 82 is light enough so that it will not crush the band between the pressers. Then the cam 83 is again operated to release the pressers from the band, and the operation is repeated.

While the operation described above may be successfully performed, we find that it is preferable to provide additional mechanism for accurately centering the skein which is to receive the band. The skein is mounted on a chain conveyor and some looseness in the chain is apt to develop which might cause inaccurate placing of the skein which is to receive a band. To avoid such inaccuracy, we have provided the centering device best shown in Figs. 3, 13, 14, and 15. Not only does this device act to center the skein, but it also compresses it to a cross-sectional area which will permit ready sliding of the band over it.

The device is shown as comprising two fingers 91, each secured to a stub shaft 92. Each shaft has secured thereto a pinion 93 meshing with a corresponding pinion on the other shaft, and one of these engages with a vertically reciprocal rack 94. When the rack is in its lowermost position, the fingers are disengaged from the skein, as shown in Fig. 15, but when the rack is raised the fingers are brought into engagement with the skein to compress it and hold it in proper position to receive a band, as indicated in Fig. 14. This movement of the rack and consequently the fingers may be caused to take place at the proper time by means of a cam 95 mounted on the cam shaft 19 and engaging a roller on a cam arm 96 which has a forked end engaging a pin 97 on the rack 94.

As a further aid in the banding operation, each mandrel 24 is provided at its end with a special formation to expand the band as it leaves the mandrel. In the present embodiment of the invention, this formation is provided by flared legs 98 (Figs. 13, 17, and 18) on the mandrel ends, which will spread the bands laterally and thus facilitate their passage over the skeins.

The operation of the apparatus will be apparent from the above description, and it will be seen that as the conveyor moves intermittently, one skein after another is brought to position in line with a turret arm at the position 24—B and is there provided with a band which has been previously formed automatically from the strip 21 on the same turret arm when it was at the position 24—A. After the band is placed on a skein, it continues on the conveyor until it is removed by the jaws 8 of the bundling mechanism in the manner known in the art.

While the invention has been shown as embodied in a specific form of apparatus, nevertheless it is to be understood that it may be embodied in other forms of apparatus, and therefore it is not intended to limit the invention except by the appended claims.

We claim:

1. In combination with a skein-forming machine having a conveyor with a plurality of skein-supports thereon, a mandrel and means to form a skein band thereon, means to move said mandrel into alignment with one of said skein-supports, and means to slide said band from said mandrel over the skein on said support.

2. In combination with a skein-forming machine having a conveyor with a plurality of skein-supports thereon, a mandrel and means to form a skein band thereon, means to move said mandrel into alignment with one of said skein-supports, means to compress the skein on said aligned support, and means to slide said band from said mandrel over said compressed skein.

3. In combination with a skein-forming machine having a conveyor with a plurality of skein-supports thereon, a mandrel and means to form a skein band thereon, means to move said mandrel into alignment with one of said skein-supports, means for centering said skein-support, and means to slide said band from said mandrel over the skein on said support.

4. In combination with a skein-forming machine having an endless conveyor with a plurality of skein-supports thereon, means to intermittently operate said conveyor to bring a skein-support to successive positions, means adjacent one of said positions to form a skein on successive supports, means to form a skein band, means to bring said band into alignment with said support at one of its positions, and means to slide said band over said support and skein at said position.

5. In combination with a skein-forming machine having a conveyor with a plurality of skein-supports thereon, a turret having a plurality of mandrels thereon, a forming mechanism adapted to cooperate with one of said mandrels to form a skein band thereon when said mandrel is in one position, means to index said turret to a second position where it is in line with one of said skein-supports, and means adjacent said second position to slide the band from its mandrel on to the skein on the support in line with the mandrel.

6. In combination with a skein-forming machine having a conveyor with a plurality of skein-supports thereon, a turret having a plurality of mandrels thereon, a forming mechanism adapted to cooperate with one of said mandrels to form a skein band thereon when said mandrel is in one position, means to index said turret to a second position where it is in line with one of said skein-supports, means adjacent said second position to slide the band from its mandrel on to the skein on the support in line with the mandrel, an indexing drum adapted to feed a strip of paper into position to be severed and formed into a band, means to index said drum, and a driving connection between said drum and turret to index them together.

7. In combination with a skein-forming machine having a conveyor with a plurality of skein-supports thereon, a turret having a plurality of mandrels thereon, a forming mechanism adapted to cooperate with one of said mandrels to form a skein band thereon when said mandrel is in one position, means to index said turret to a second position where it is in line with one of said skein-supports, means adjacent said second position to slide the band from its mandrel on to the skein on the support in line with the mandrel, an indexing drum adapted to feed a strip of paper into position to be severed and formed into a band, means to index said drum, a driving connection between said drum and turret to index them together, and means to operate said drum by hand, independently of said turret, to feed the strip continuously.

8. In combination with a skein-forming machine having a conveyor with a plurality of skein-supports thereon, a turret having a plurality of mandrels thereon, a forming mechanism adapted to cooperate with one of said mandrels to form a skein band thereon when said mandrel is in one position, means to index said turret to a second position where it is in line with one of said skein-supports, means adjacent said second position to slide the band from its mandrel on to the skein on the support in line with the mandrel, an indexing drum adapted to feed a strip of paper into position to be severed and formed into a band, means to index said drum, and a driving connection between said drum and turret to index them together, said drum indexing means comprising a pawl and ratchet permitting manual operation of the drum to feed the strip continuously and independently of the turret.

9. In combination with a skein-forming machine having a conveyor with a plurality of skein-supports thereon, means to form a skein band on a mandrel, means to move said mandrel into alignment with one of said skein-supports, grippers disposed on opposite sides of said mandrel when in said alignment, and means to cause said grippers to engage a band on said mandrel and to slide it off the mandrel on to the skein on said aligned support.

10. In combination with a skein-forming machine having a conveyor with a plurality of skein-supports thereon, a mandrel and means to form a skein band thereon, means to move said mandrel into alignment with one of said skein-supports, and means to slide said band from said mandrel over the skein on said support, said mandrel being formed to expand the band as it is slid therefrom.

11. In combination with a skein-forming machine having a conveyor with a plurality of skein-supports thereon, a mandrel and means to form a skein band thereon, means to move said mandrel into alignment with one of said skein-supports, a pair of pivoted grippers disposed on opposite sides of said mandrel when in said alignment, a spring urging said grippers towards said mandrel to grip a band thereon, a cam adapted to force said grippers apart, means to operate said cam, and means to move said grippers lengthwise of a mandrel when they are in engagement with a band thereon.

12. In combination with a skein-forming machine having a conveyor with a plurality of skein-supports thereon, a mandrel and means to form a skein band thereon, means to move said mandrel into alignment with one of said skein-supports, a pair of pivoted grippers disposed on opposite sides of said mandrel when in said alignment, means to move said grippers towards each other to grip a band on the mandrel, means then to move said grippers lengthwise of the mandrel to slide the gripped band therefrom on to said skein, means then to move the grippers away from each other to release the band, and means then to move the grippers back to initial position.

13. In combination with a skein-forming machine having a conveyor with a plurality of skein-supports thereon, a mandrel and means to form a skein band thereon, means to move said mandrel into alignment with one of said skein-supports, means to slide said band from said mandrel over the skein on said support, fingers disposed on opposite sides of the skein on said aligned support, and means to move said fingers into engagement with opposite sides of said skein when the support is stationary.

14. In combination with a skein-forming machine having a conveyor with a plurality of skein-supports thereon, a mandrel and means to form a skein band thereon, means to move said mandrel into alignment with one of said skein supports, fingers adapted to engage the skein on said one support and center it, means to move said fingers away from said skein, and means then to move the band on said mandrel on to said skein.

15. In combination with a skein-forming machine having a conveyor with a plurality of skein supports thereon, a mandrel and means to form a skein band thereon, means to move said mandrel into alignment with one of said skein supports, a pair of pivoted centering fingers, means to move said fingers into engagement with a skein on said one support, a pair of pivoted grippers disposed on opposite sides of said mandrel when in said alignment, means to move said grippers towards each other to grip said band on said mandrel, means to move said fingers away from said skein, means to move said grippers lengthwise of the mandrel to slide the gripped band therefrom on to said skein, and means to release the grippers.

WILLIAM H. TAYLOR.
STANLEY C. KERSHAW.